(12) United States Patent
Friedman et al.

(10) Patent No.: US 10,296,486 B2
(45) Date of Patent: *May 21, 2019

(54) WRITE CACHE AND WRITE-HOLE RECOVERY IN DISTRIBUTED RAID OVER SHARED MULTI-QUEUE STORAGE DEVICES

(71) Applicant: E8 STORAGE SYSTEMS LTD., Ramat-Gan (IL)

(72) Inventors: Alex Friedman, Hadera (IL); Alex Liakhovetsky, Ra'anana (IL); Yoni Divinsky, Tel Aviv (IL); Evgeny Budilovsky, Yehud (IL); Itay Gonshorovitz, Petach-Tiqwa (IL); Barak Pinhas, Givatayim (IL)

(73) Assignee: E8 STORAGE SYSTEMS LTD., Ramat-Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,355

(22) Filed: Nov. 8, 2017

(65) Prior Publication Data

US 2018/0060274 A1    Mar. 1, 2018

Related U.S. Application Data

(63) Continuation of application No. 15/424,921, filed on Feb. 6, 2017, now Pat. No. 9,842,084.

(60) Provisional application No. 62/318,243, filed on Apr. 5, 2016.

(51) Int. Cl.
*G06F 15/167* (2006.01)
*H04L 29/08* (2006.01)

(52) U.S. Cl.
CPC ........ *G06F 15/167* (2013.01); *H04L 67/1097* (2013.01); *H04L 67/2842* (2013.01)

(58) Field of Classification Search
CPC .......................... G06F 15/167; H04L 67/1097
See application file for complete search history.

(56) References Cited

U.S. PATENT DOCUMENTS

| 6,584,517 | B1 * | 6/2003 | Raza | ....................... H04L 49/90 |
| | | | | 370/230 |
| 2003/0105830 | A1 | 6/2003 | Pham et al. | |
| 2006/0179197 | A1 | 8/2006 | Chung et al. | |
| 2012/0078978 | A1 | 3/2012 | Shoolman et al. | |
| 2014/0245444 | A1 | 8/2014 | Lutas et al. | |

(Continued)

OTHER PUBLICATIONS

U.S. Appl. No. 15/847,992 Office Action dated Apr. 13, 2018.
U.S. Appl. No. 15/168,055 office action dated Sep. 25, 2018.

*Primary Examiner* — Hua Fan
(74) *Attorney, Agent, or Firm* — Kligler & Associates

(57) ABSTRACT

A method for data storage includes, in a system that includes multiple servers, multiple multi-queue storage devices and at least one storage controller that communicate over a network, storing data by the servers in a storage process that (i) caches the data in a cache memory that is accessible to the servers and to the storage devices and (ii) de-stages the cached data from the cache memory to the storage devices. A progress of the storage process is continually journaled, by the servers, in a plurality of server-specific journals residing in the cache memory. In response to a failure occurring during the storage process, the data is recovered by the storage controller based on the server-specific journals.

20 Claims, 2 Drawing Sheets

(56) References Cited

U.S. PATENT DOCUMENTS

2014/0304525 A1 10/2014 Novak
2015/0012699 A1* 1/2015 Rizzo .................. G06F 12/0866
 711/113
2015/0379009 A1 12/2015 Reddy
2016/0026652 A1 1/2016 Zheng
2016/0231948 A1 8/2016 Gupta et al.

* cited by examiner

WRITE CACHE AND WRITE-HOLE RECOVERY IN DISTRIBUTED RAID OVER SHARED MULTI-QUEUE STORAGE DEVICES

CROSS-REFERENCE TO RELATED APPLICATIONS

This application is a continuation of U.S. patent application Ser. No. 15/424,921, filed Feb. 6, 2017, which claims the benefit of U.S. Provisional Patent Application 62/318,243, filed Apr. 5, 2016. The disclosures of these related applications are incorporated herein by reference.

FIELD OF THE INVENTION

The present invention relates generally to data storage, and particularly to methods and systems for distributed storage.

BACKGROUND OF THE INVENTION

Various techniques for distributed data storage are known in the art. For example, U.S. Pat. No. 9,112,890, whose disclosure is incorporated herein by reference, describes a method for data storage including, in a system that includes one or more storage controllers, multiple servers and multiple multi-queue storage devices, assigning in each storage device server-specific queues for queuing data-path storage commands exchanged with the respective servers. At least some of the data-path storage commands are exchanged directly between the servers and the storage devices, not via the storage controllers, to be queued and executed in accordance with the corresponding server-specific queues.

SUMMARY OF THE INVENTION

An embodiment of the present invention that is described herein provides a method for data storage. The method includes, in a system that includes multiple servers, multiple multi-queue storage devices and at least one storage controller that communicate over a network, storing data by the servers in a storage process that (i) caches the data in a cache memory that is accessible to the servers and to the storage devices and (ii) de-stages the cached data from the cache memory to the storage devices. A progress of the storage process is continually journaled, by the servers, in a plurality of server-specific journals residing in the cache memory. In response to a failure occurring during the storage process, the data is recovered by the storage controller based on the server-specific journals.

Typically, storing the data and journaling the progress are performed by remote direct memory access, without triggering or running code on any CPU of the storage controller. In some embodiments, storing the data includes distributing across the storage devices stripes that include the data and redundancy associated with the data, and recovering the data includes reconstructing the stripes based on the server-specific journals and the redundancy.

In an embodiment, recovering the data includes, in response to a failure associated with a given server, collecting from the server-specific journals entries relating to one or more stripes accessed by the given server, and reconstructing the stripes based on the entries. In another embodiment, recovering the data includes obtaining at least some of the data or the redundancy from one or more of the servers, and reconstructing the stripes using the data or the redundancy obtained from the one or more of the servers. In yet another embodiment, the stripes each consist of N data blocks and c redundancy blocks, and recovering the data includes reconstructing the stripes based on fewer than N+c of the server-specific journals, or based on fewer than N+c server-specific portions of the cache memory.

In a disclosed embodiment, the failure occurs in a recovery process that runs in the storage controller. In an example embodiment, recovering the data includes performing a simulated run of a recovery process that recovers the data, and, only upon success of the simulated run, performing an actual run of the recovery process. In another embodiment, storing the data includes storing a first copy of the cache memory on one or more of the servers, and storing a second copy of the cache memory on the storage controller or on one or more of the storage devices.

In yet another embodiment, caching of the data in the cache memory and subsequent de-staging of the data to the storage devices includes increasing an effective queue depth of a workload that generates the data. In still another embodiment, the cache memory resides on the storage devices, such that storing the data includes transferring the data over the network only once.

There is additionally provided, in accordance with an embodiment of the present invention, a system for data storage, including multiple servers and at least one storage controller. The multiple servers are configured to store data over a network on multiple multi-queue storage devices in a storage process that (i) caches the data in a cache memory that is accessible to the servers and to the storage devices and (ii) de-stages the cached data from the cache memory to the storage devices, and to continually journal a progress of the storage process in a plurality of server-specific journals residing in the cache memory. The at least one storage controller is configured, in response to a failure occurring during the storage process, to recover the data based on the server-specific journals.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for distributed data storage. The disclosed techniques are typically implemented in a computing system comprising multiple servers that store data in multiple shared multi-queue storage devices, and one or more storage controllers. Computing systems of this sort are described, for example, in U.S. Pat.

Nos. 9,112,890, 9,274,720, 9,519,666, 9,521,201, 9,525,737 and 9,529,542, whose disclosures are incorporated herein by reference.

In the disclosed embodiments, the servers store data using a redundant storage scheme, e.g., RAID, in which stripes of data blocks and redundancy blocks are distributed across the storage devices. The data and parity blocks are initially cached in a cache memory (referred to as "staging RAM" or "NVRAM cache"), and subsequently transferred for persistent storage from the staging RAM to the storage devices. Both the servers and the storage devices typically access the staging RAM using Remote Direct Memory Access (RDMA).

In some disclosed embodiments, a storage controller runs a recovery process that recovers from "write hole" scenarios, in which some system element fails during a write operation. In order to facilitate such recovery, each server maintains on the staging RAM a respective server-specific journal, in which the server continually records the status and progress of the write operations it performs.

Upon detecting a write-hole scenario, the recovery process retrieves the relevant entries from the various server-specific journals, and attempts to recover lost data and complete interrupted write operations. In addition to the information in the server-specific journals, the recovery process may also use information retrieved from one or more of the servers, the staging RAM and/or one or more of the storage devices.

Throughout the disclosed techniques, data-path operations, including write operations and journaling, are carried out by the servers using RDMA without triggering or running code on any storage controller CPU. The data-path operations are performed without running code on any centralized entity and without a need for servers to communicate with one another for coordination. As such, the disclosed techniques are highly distributed and scalable.

System Description

Figure 1:
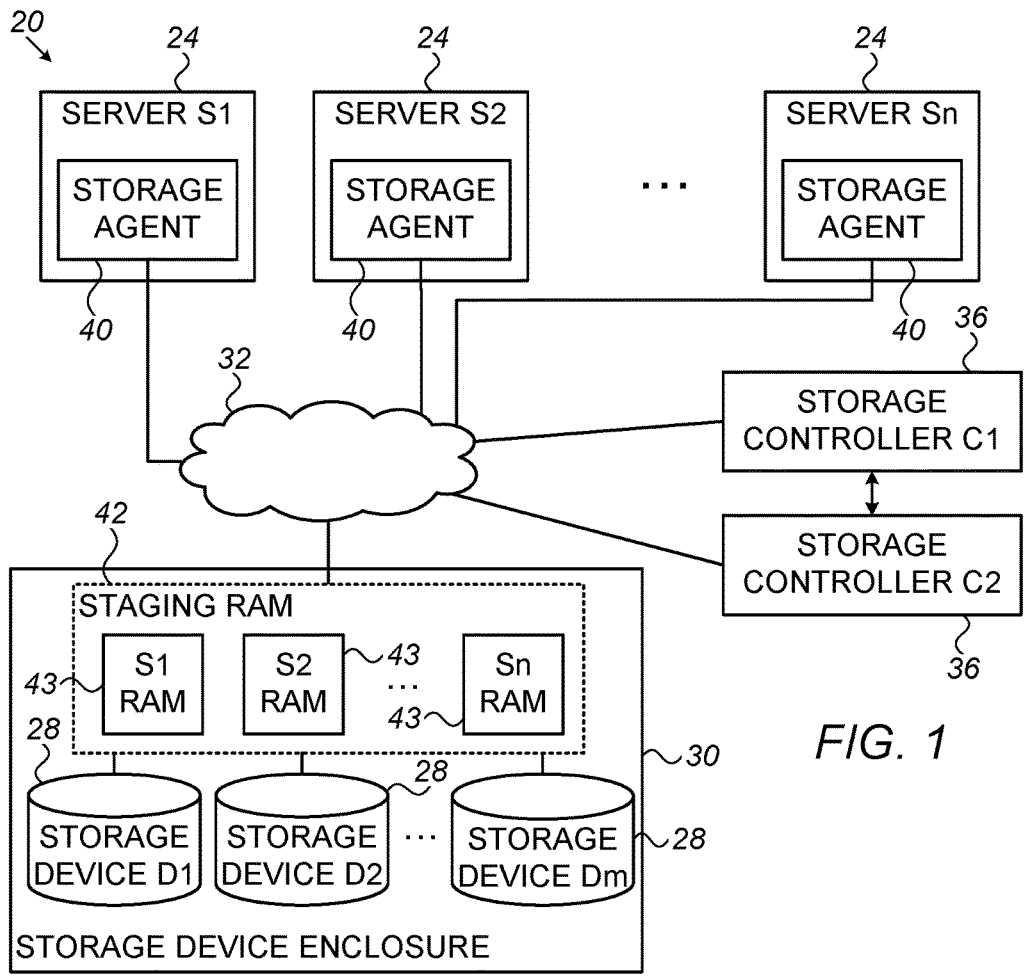
FIG. 1 is a block diagram that schematically illustrates a computing system that uses distributed data storage, in accordance with an embodiment of the present invention.

FIG. 1 is a block diagram that schematically illustrates a computing system 20, in accordance with an embodiment of the present invention. System 20 may comprise, for example, a data center, a High-Performance Computing (HPC) cluster, or any other suitable system. System 20 comprises multiple servers 24 denoted S1 . . . Sn, and multiple storage devices 28 denoted D1 . . . Dm. The servers and storage devices are interconnected by a communication network 32. The system further comprises one or more storage controllers 36 that manage the storage of data in storage devices 28.

In the disclosed techniques, data-path operations such as writing and readout are performed directly between the servers and the storage devices, without having to trigger or run code on the storage controller CPUs. The storage controller CPUs are involved only in relatively rare control-path operations. Moreover, the servers do not need to, and typically do not, communicate with one another or otherwise coordinate storage operations with one another. Coordination is typically performed by the servers accessing shared data structures that reside, for example, in the memories of the storage controllers.

In the present example, although not necessarily, storage devices 28 are comprised in a storage-device enclosure 30, e.g., a rack, drawer or cabinet. Enclosure 30 further comprises a staging Random Access Memory (RAM) unit 42 that comprises multiple staging RAMS 43. The staging RAM unit is used as a front-end for temporary caching of I/O commands en-route from servers 24 to storage devices 28. Staging RAMS 43 are therefore also referred to herein as interim memory. The structure and functionality of the staging RAM are addressed in greater detail below. Enclosure 30 may also comprise a Central Processing Unit (CPU—not shown). The staging RAM and staging RAM unit are also referred to herein as "NVRAM cache" or "cache memory."

Storage-related functions in each server 24 are carried out by a respective storage agent 40. Agents 40 typically comprise software modules installed and running on the respective servers. The functions of agents 40, and their interaction with staging RAM unit 42, storage devices 28 and storage controllers 36, are described in detail below.

Servers 24 may comprise any suitable computing platforms that run any suitable applications. In the present context, the term "server" includes both physical servers and virtual servers. For example, a virtual server may be implemented using a Virtual Machine (VM) that is hosted in some physical computer. Thus, in some embodiments multiple virtual servers may run in a single physical computer. Storage controllers 36, too, may be physical or virtual. In an example embodiment, the storage controllers may be implemented as software modules that run on one or more physical servers 24.

Storage devices 28 may comprise any suitable storage medium, such as, for example, Solid State Drives (SSD), Non-Volatile Random Access Memory (NVRAM) devices or Hard Disk Drives (HDDs). In an example embodiment, storage devices 28 comprise multi-queued SSDs that operate in accordance with the NVMe specification. In such an embodiment, each storage device 28 provides multiple server-specific queues for storage commands. In other words, a given storage device 28 queues the storage commands received from each server 24 in a separate respective server-specific queue. The storage devices typically have the freedom to queue, schedule and reorder execution of storage commands. The terms "storage commands" and "I/Os" are used interchangeably herein.

Network 32 may operate in accordance with any suitable communication protocol, such as Ethernet or Infiniband. In some embodiments, some of the disclosed techniques can be implemented using Direct Memory Access (DMA) and/or Remote Direct Memory Access (RDMA) operations. The embodiments described below refer mainly to RDMA protocols, by way of example. Various variants of RDMA may be used for this purpose, e.g., Infiniband (IB), RDMA over Converged Ethernet (RoCE), Virtual Interface Architecture and internet Wide Area RDMA Protocol (iWARP). Further alternatively, the disclosed techniques can be implemented using any other form of direct memory access over a network, e.g., Direct Memory Access (DMA), various Peripheral Component Interconnect Express (PCIe) schemes, or any other suitable protocol. In the context of the present patent application and in the claims, all such protocols are referred to as "remote direct memory access." Any of the RDMA operations mentioned herein is performed without triggering or running code on any storage controller CPU.

Generally, system 20 may comprise any suitable number of servers, storage devices and storage controllers. In the present example, the system comprises two storage controllers denoted C1 and C2, for resilience. In an example embodiment, both controllers are continuously active and provide backup to one another, and the system is designed to survive failure of a single controller.

In the embodiments described herein, the assumption is that any server 24 is able to communicate with any storage device 28, but there is no need for the servers to communicate with one another. Storage controllers 36 are assumed to be able to communicate with all servers 24 and storage devices 28, as well as with one another.

The configuration of system 20 shown in FIG. 1 is an example configuration, which is chosen purely for the sake of conceptual clarity. In alternative embodiments, any other suitable system configuration can be used. For example, the system may comprise only a single storage controller 36. In other embodiments, the functionality of storage controllers 36 may be distributed among servers 24.

The different system elements may be implemented using suitable hardware, using software, or using a combination of hardware and software elements. Each server 24 typically comprises a suitable network interface for communicating over network 32, e.g., with the storage devices and/or storage controllers, and a suitable processor that carries out the various server functions. Each storage controller 36 typically comprises a suitable network interface for communicating over network 32, e.g., with the storage devices and/or servers, and a suitable processor that carries out the various storage controller functions.

In some embodiments, servers 24 and/or storage controllers 36 comprise general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Figure 2:
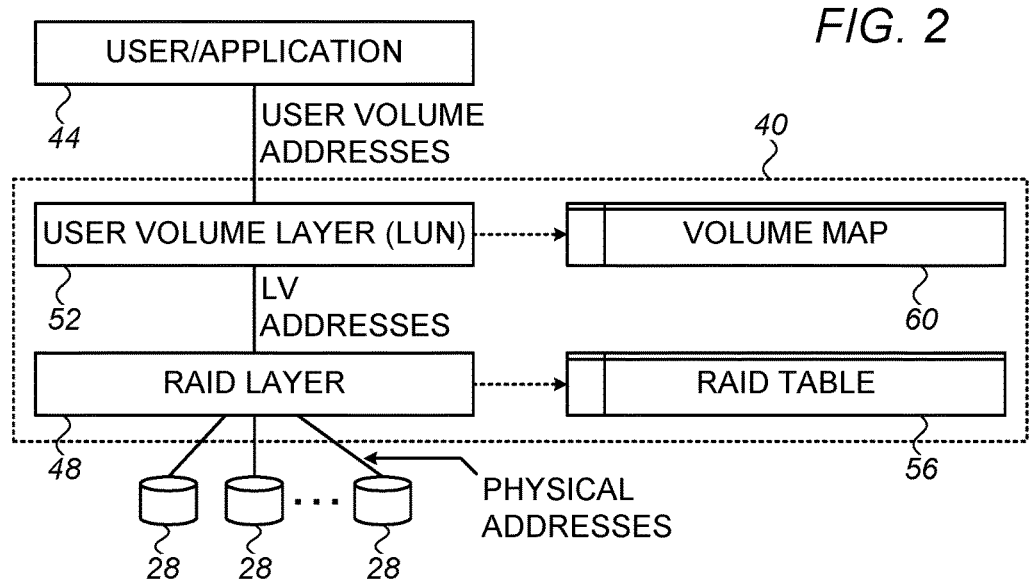
FIG. 2 is a block diagram that schematically illustrates elements of a storage agent, in accordance with an embodiment of the present invention.

FIG. 2 is a block diagram that schematically illustrates elements of storage agent 40, in accordance with an embodiment of the present invention. A respective storage agent of this sort typically runs on each server and performs storage-related functions for user applications 44 running on the server. As noted above, servers 24 may comprise physical and/or virtual servers. Thus, a certain physical computer may run multiple virtual servers 24, each having its own respective storage agent 40.

In the disclosed embodiments, each storage agent 40 comprises a Redundant Array of Independent Disks (RAID) layer 48 and a user-volume layer 52. RAID layer 48 carries out a redundant storage scheme over storage devices 28, including handling storage resiliency, detection of storage device failures, rebuilding of failed storage devices and rebalancing of data in case of maintenance or other evacuation of a storage device. RAID layer 48 also typically stripes data across multiple storage devices 28 for improving storage performance.

In one simple example embodiment, RAID layer 48 implements a RAID-10 scheme, i.e., replicates and stores two copies of each data item on two different storage devices 28. One of the two copies is defined as primary and the other as secondary. The primary copy is used for readout as long as it is available. If the primary copy is unavailable, for example due to storage-device failure, the RAID layer reverts to read the secondary copy.

Alternatively, however, RAID layer 48 may implement any other suitable redundant storage scheme (RAID-based or otherwise), such as schemes based on erasure codes, RAID-1, RAID-4, RAID-5, RAID-6, RAID-10, RAID-50, multi-dimensional RAID schemes, or any other suitable redundant storage scheme.

Typically, RAID layer 48 stores data in stripes that are distributed over multiple storage devices, each stripe comprising multiple data elements and one or more redundancy elements (e.g., parity) computed over the data elements. The description below refers mainly to stripes that are made up of data and redundancy blocks, but the disclosed techniques can be used with other suitable types of data and redundancy elements. The terms "parity" and "redundancy" are used interchangeably herein. For the sake of clarity, the embodiments described herein refer mainly, although not exclusively, to RAID-6 in which stripe comprises N data blocks and two parity blocks.

RAID layer 48 accesses storage devices 28 using physical addressing. In other words, RAID layer 48 exchanges with storage devices 28 read and write commands, as well as responses and retrieved data, which directly specify physical addresses (physical storage locations) on the storage devices. In this embodiment, all logical-to-physical address translations are performed in agents 40 in the servers, and none in the storage devices.

The RAID layer maps between physical addresses and Logical Volumes (LVs) to be used by user-volume layer 52. Each LV is mapped to two or more physical-address ranges on two or more different storage devices. The two or more ranges are used for storing the replicated copies of the LV data as part of the redundant storage scheme.

The redundant storage scheme (e.g., RAID) is thus hidden from user-volume layer 52. Layer 52 views the storage medium as a set of guaranteed-storage LVs. User-volume layer 52 is typically unaware of storage device failure, recovery, maintenance and rebuilding, which are handled transparently by RAID layer 48. (Nevertheless, some optimizations may benefit from such awareness by layer 52. For example, there is no need to rebuild unallocated storage space.)

User-volume layer 52 provides storage resources to applications 44 by exposing user volumes that are identified by respective Logical Unit Numbers (LUNs). The terms "user volume" and "LUN" are used interchangeably herein. In other words, a user application 44 views the storage system as a collection of user volumes, and issues storage commands having user-volume addresses.

In the embodiments described herein, the user-volume addresses are also referred to as User Block Addresses (UBAs) and the LV addresses are also referred to as RAID Block Addresses (RBAs). Thus, layer 52 in each server 24 translates between UBAs and RBAs.

Storage agent 40 translates between the different address spaces using a RAID table 56 and a volume map 60. RAID table 56 holds the translation between LV addresses and physical addresses, and volume map 60 holds the translation between user-volume addresses and LV addresses.

Typically, any server 24 may attach to any user volume. A given user volume may have multiple servers attached thereto. In some embodiments, storage controllers 36 define and maintain a global volume map that specifies all user volumes in system 20. Volume map in each storage agent 40 comprises a locally-cached copy of at least part of the global volume map. In agent 40 of a given server, volume map 60 holds at least the mapping of the user volumes (LUNs) to which this server is attached. In an embodiment, volume map 60 supports thin provisioning.

Certain aspects of distributed storage systems of the sort shown in FIGS. 1 and 2 are also addressed in U.S. Pat. Nos. 9,112,890, 9,274,720, 9,519,666, 9,521,201, 9,525,737 and 9,529,542, cited above.

In some embodiments, a given server 24 may run multiple different instances of the data path, with each instance accessing storage devices 28 separately. Typically, the multiple data-path instances are implemented by running on the same server multiple different instances of RAID layer 48 that each accesses the storage devices separately. Each data-path instance (e.g., each instance of RAID layer 48) is referred to herein as a "thread" or "data-path thread." For the sake of clarity, the embodiments described herein refer mainly to implementations having a single thread per server 24. Aspects of operating multiple threads on the same server are addressed below.

In addition to the recovery processes described herein, the use of staging RAM 32 is also advantageous as it effectively converts write workloads having low queue depth (e.g., queue depth of 1) into write workloads having a high queue depth, thereby significantly improving the average write latency, throughput and IOPS of such workloads.

Journaling of Write I/O Operations

Figure 3:
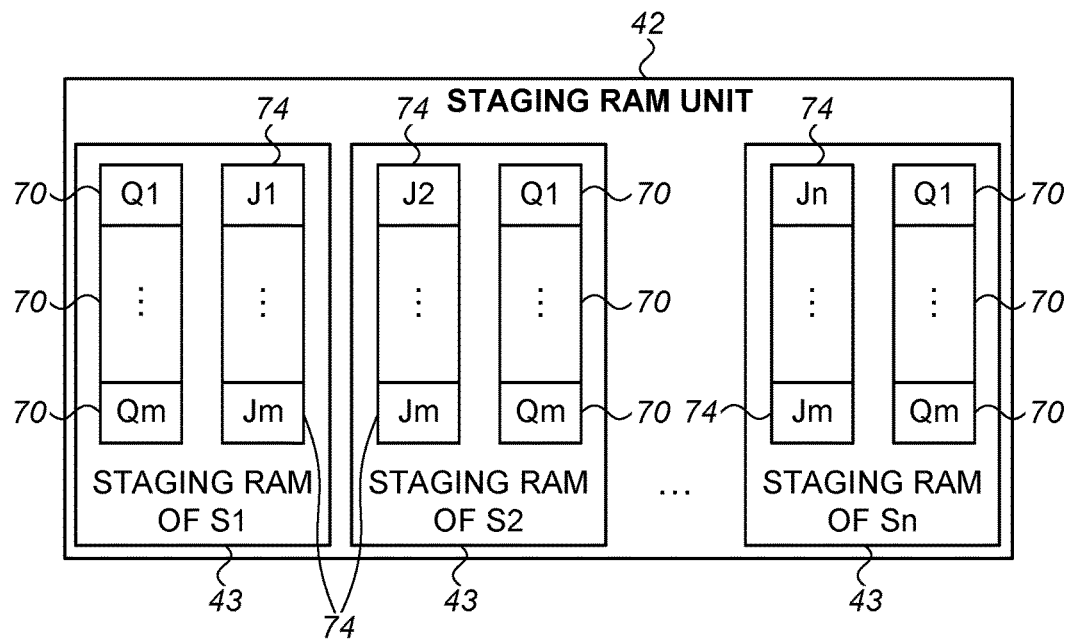
FIG. 3 is a block diagram that schematically illustrates a staging Random Access Memory (RAM) unit, in accordance with an embodiment of the present invention.

FIG. 3 is a block diagram that schematically illustrates additional details of staging RAM unit 42, in accordance with an embodiment of the present invention. As explained above, staging RAM unit 42 comprises n staging RAMS 43, a respective staging RAM 43 assigned to each server 24. In the preset example, each staging RAM is implemented as a respective memory region in the memory of storage controller 36. In alternative embodiments, staging RAMS 43, and/or staging RAM unit 42 as a whole, may be located at any other suitable location in system 20.

In the example of FIG. 3, each server 24 is assigned m storage-device-specific queues 70 in staging RAM 43 of that server, for queuing both read and write operations originating from the server. Thus, staging RAM 43 of the $i^{th}$ server comprises m queues 70, denoted Q1 . . . Qm, for queuing the read and write commands originating from the $i^{th}$ server and destined to storage devices D1 . . . Dm, respectively.

In addition, each server 24 maintains m server-specific journals 74 in its respective staging RAM 43. Each server records in journals 74 the exact state of each write operation it performs. Thus, staging RAM 43 of the $i^{th}$ server comprises m journals 74, denoted J1 . . . Jm, for journaling the write commands originating from the $i^{th}$ server and destined to storage devices D1 . . . Dm, respectively. Journals 74 may be implemented using any suitable data structure. As will be explained below, a recovery process running on storage controller 36 uses the n×m journals for recovering from various failure scenarios.

In some embodiments, an additional journal (not shown in the figure) is maintained for the recovery process running on storage controller 36, and is used for recovering from failures occurring during the recovery process.

Typically, servers 24 and storage controllers 36 access journals 74 using RDMA commands. Servers 24 update their respective journals 74 using RDMA write commands, without running code on any processor of the storage controller. Upon recovery, storage controller 36 reads journals 74 using RDMA read commands.

Typically, agent 40 in a given server 24 divides each write I/O operation into multiple phases. After completing each phase, agent 40 writes a corresponding journal entry to journal 74. Agent 40 proceeds to the next phase only upon successful writing of the journal entry of the current phase.

In the first phase of a write I/O operation, referred to as "early-stage phase," agent 40 writes the data using RDMA write to staging RAM 43. The data is written to the appropriate queues 70, depending on the storage devices to which the data is destined, in accordance with the applicable RAID scheme. Along with this phase, agent 40 writes a WRITE_STAGE journal entry to journal 74. Agent 40 acknowledges the write to user application 44 only once both the data and journal writes are acknowledged.

If the write operation is part of a partial-stripe write or degraded write (as opposed to a full-stripe write), the next phase is a "read-before-write" phase, followed by parity calculation. In this phase, agent 40 reads the previous version of the data, and then updates the parity based on the previous data and the new data. Agent 40 writes a READ_COMPLETE journal entry after each successful read-before-write (once the storage device read command succeeds and the data is read using RDMA read from the remote staging RAM via the staging RAM to the server). Agent 40 then calculates the updated parities, and writes them using RDMA write to the staging RAM, into queues 70 of their respective storage devices 28 in accordance with the current RAID scheme. Agent 40 writes a WRITE_STAGE journal entry to journal 74, along with writing the parities to the remote staging RAM.

The next phase is a "completion phase" in which the write is committed from the staging RAM to storage devices 28. Agent 40 proceeds to the completion phase only once both the staging RAM RDMA writes and the journal RDMA writes of the read-before-write phase have been acknowledged. After a write completion acknowledgement is received from the storage device, agent 40 writes a WRITE_COMPLETE journal entry to journal 74. Typically, agent 40 does not wait for acknowledgement for this journal entry, since it merely marks the journal as complete, for enabling recovery processes to disregard complete writes.

In some embodiments, each journal has a header comprising the following parameters:

Journal type (e.g., whether the journal is a journal 74 associated with a server, or a journal maintained for the recovery process).

Server ID (for a server journal 74).

Server recovery ID (for a recovery-process journal)—A Universally Unique ID (UUID) that is issued by the server upon connection of its RAID layers, as defined in detail below).

Server RAID ID (one per data-path thread on each server).

A list of storage devices 28 used by the server.

When using the above partitioning of write commands into phases, each entry in a journal (server journal or recovery-process journal) comprises the following parameters:

Entry type (INVALID, READ_COMPLETE, WRITE_STAGE or WRITE_COMPLETE).

Offset of the data of the journaled write operation, within the queue 70 of the corresponding storage device in staging RAM 43 of the corresponding server.

RAID-level write parameters (RBA, block count, request ID).

In an entry of a recovery-process journal, the following parameters are added:
  a. Server ID of the original (recovered) I/O operation.
  b. RAID ID of the original (recovered) I/O operation.
  c. Request ID of the original (recovered) I/O operation.

The RAID-level write parameters identify the exact operations taking place, the expected storage devices, and locations on the storage devices, targeted by the write operation being journaled.

Write-Hole Scenarios

In many practical scenarios, an element of system 20 may fail during a write operation to a certain stripe of the applicable RAID scheme. Such a failure may occur, for example, in a server 24, in a storage controller 36, in staging RAM unit 42, in a storage device 28, or in a combination of such elements. Failure of this sort, during a write operation, may cause inconsistency between the data and the parity of the stripe, and thus corrupt the entire stripe. This problem is referred to as a "write hole."

The description that follows lists examples of possible write-hole scenarios that are mitigated by the recovery processes described herein. The recovery process appropriate for each scenario depends, for example, on the RAID scheme being used (e.g., RAID-5 vs. RAID-6), the state of journals 74 at the time of failure, the phase of the write operation in which the failure has occurred, and possibly other factors. Such factors determine the states in which the recovery process will find the journals, the staging RAM and the storage devices when attempting recovery.

Note that the recovery process itself is also an element that writes data and may fail during a write operation. As such, failure of a recovery process is also considered a write-hole scenario and is addressed herein.

Single Storage Device Disconnected

In some embodiments, when a server 24 detects that a single storage device 28 is disconnected, the detecting server temporarily disconnects itself from all other storage devices. The detecting server waits for the recovery process to complete, and then resumes I/O operations, including replaying any I/O operations that did not complete prior to disconnection.

The recovery process on storage controller 36 identifies that the server in question has disconnected from storage device 28, and in response fixes all write holes according to the journal entries that were recorded by the (now disconnected) detecting server. If the recovery process is unable to access a certain storage device 28 for longer than a configurable time period, the recover process marks the storage device in question as failed, such that when the detecting server reconnects, it will discover that the storage device is marked as failed. In some embodiments, staging RAM 43 entries relating to a failed storage device 28 may still be used, assuming the staging RAM does not physically reside in the storage device itself.

Single Storage Device Failure

In an embodiment, when a single storage device 28 returns an I/O error in response to a command from a certain server 24, RAID layer 44 of that server blocks all subsequent I/Os (or possibly blocks only write I/Os) and requests storage controller 36 to define the storage device as failed. Once storage controller 36 replicates the state and acknowledges, the server is permitted to proceed. Raid layer 44 of the server then reverts to a degraded mode, by removing the failed storage device from all RAID stripes. From this point, subsequent write I/Os will exclude the failed storage device. Subsequent read I/Os to the failed storage device will be responded to by rebuilding the requested data from the remaining data and parity of the stripe.

Single Staging RAM Failure

In this failure mode, all the staging RAM of a given storage device is lost, including the corresponding journal 74, but the data is still available in the server. Typically, each server retains a local copy of all information it stores on the staging RAM. This local copy can be used for recovery from staging RAM failure, assuming of course that the server is functional. In an embodiment, recovery from this failure mode is similar to the "single storage device disconnected" scenario above. In the present case, however, the recovery process is unable to read from the journals and staging RAM, and therefore instead reads the relevant data from the server, e.g., through a control channel.

Staging RAM and Storage Device Failure

This scenario is a combination of the "single staging RAM failure" and "single storage device failure" scenarios above. Storage controller 36 recovers from this scenario similarly to the recovery from the single staging RAM failure, with the exception that the recovery process performs degraded writes that exclude the failed storage device.

Storage Controller Failure

In embodiments in which the staging RAM and journals are stored in the memories of storage controllers 36, when a storage controller fails, all the staging RAMS and journals on the failed controller are considered failed. In this scenario, a peer storage controller exists and serves as the current (only) active controller. This storage controller carries out a recovery process similar to recovery from a single staging RAM failure, with the recovery process retrieving the relevant data from servers 24, for example via their control connections, and fixing any detected write holes.

Storage Controller and Storage Device Failure

In this scenario, the recovery is similar to the individual recovery processes from controller failure and from storage device failure.

Storage Controller and Staging RAM Failure

In this scenario, the recovery is similar to the individual recovery processes from controller failure and from staging RAM failure.

Storage Controller, Staging RAM and Storage Device Failure

If the failed staging RAM belongs to the failed storage device, the recovery process is similar to the "storage controller and staging RAM failure" scenario above. If an additional storage device fails, in addition to the staging RAM failure, then in RAID-6 (stripes of two data blocks and two parity blocks, denoted 2+P+Q) the RAID layer is able to recover using the remaining data and parity of the stripe. If the staging RAM is reset and becomes active, a RAID-5 scheme is also able to recover and continue using the same logic as in the scenarios above. The ability to recover from this scenario also depends on the storage devices targeted by specific write I/Os. The recovery processes described below attempt to recover write I/Os even in more extreme cases.

Server Disconnection

In the present example, each write operation is divided into four phases denoted "early-stage phase," "read-before-write phase," "staging phase" and "completion phase." The early-stage phase comprises writing the server's data to the staging RAM along with the respective journal entries and acknowledging the server once these writes are successful. The (optional) read-before-write phase comprises reading data needed for parity calculation and writing its respective journal entries. For a partial write, all blocks that are to be written are first read, guaranteeing a read complete journal entry to exist for every block before its write is committed.

The staging phase comprises writing the parity entries to the staging RAM and writing their respective journal entries. The completion phase, which occurs only once all the previous phases are complete and acknowledged, comprises committing the writes to the storage devices, waiting for I/O completions, writing journal write completion entries and dismissing a sequence of completed journal entries.

Server disconnection in the early-stage phase: In this scenario, a server 24 becomes disconnected before RDMA write completion of both data and journal entries were received by RAID layer 44 of that server. In this state the server did not receive acknowledgement regarding the write, and all new data should be ignored. Since all the new data resides in the staging RAM, the data on the storage devices is the data to be maintained. The recovery process therefore traverses the relevant server journals 74, attempting to identify I/Os that were sent by the disconnected server. The recovery process then identifies I/Os that are still in the early-stage phase (by examining the journal entries) and dismisses these journal entries along with their staged data buffers.

Server disconnection during the read-before-write phase: In this scenario, the server may have already acknowledged the write, and therefore the recovery process should commit this write. The recovery process of the storage controller thus traverses all such I/Os of the disconnected server, on all journals, and writes them using its own RAID layer as will be elaborated below.

Server disconnection during the staging phase: In this scenario, a server is disconnected after receiving acknowledgement for the write (i.e., the staging RAM already holds the new data) but before any of the data was written to the storage devices. The recovery process therefore traverses all such I/Os of the disconnected server, on all journals, and writes them using its own RAID layer as will be elaborated below.

Server disconnection during the completion stage: In this scenario a server becomes disconnected after the data, parity and their respective journal entries have all been written to the staging RAM and journals. Some of the data and/or parity blocks may have also been written to the storage devices. The recovery process thus attempts to reconstruct the write from all available data. If the available data is insufficient for recovery of a certain data block, the recovery process writes a magic block in its place. In the present context, the term "magic block" refers to a block containing dummy data that can be identified with high likelihood as dummy, i.e., data that is highly unlikely to be created naturally.

The write-hole scenarios listed above are depicted solely by way of example. The disclosed techniques can be used for mitigating any other suitable write-hole scenario.

Write-Hole Recovery Using Distributed Journals

Figure 4:
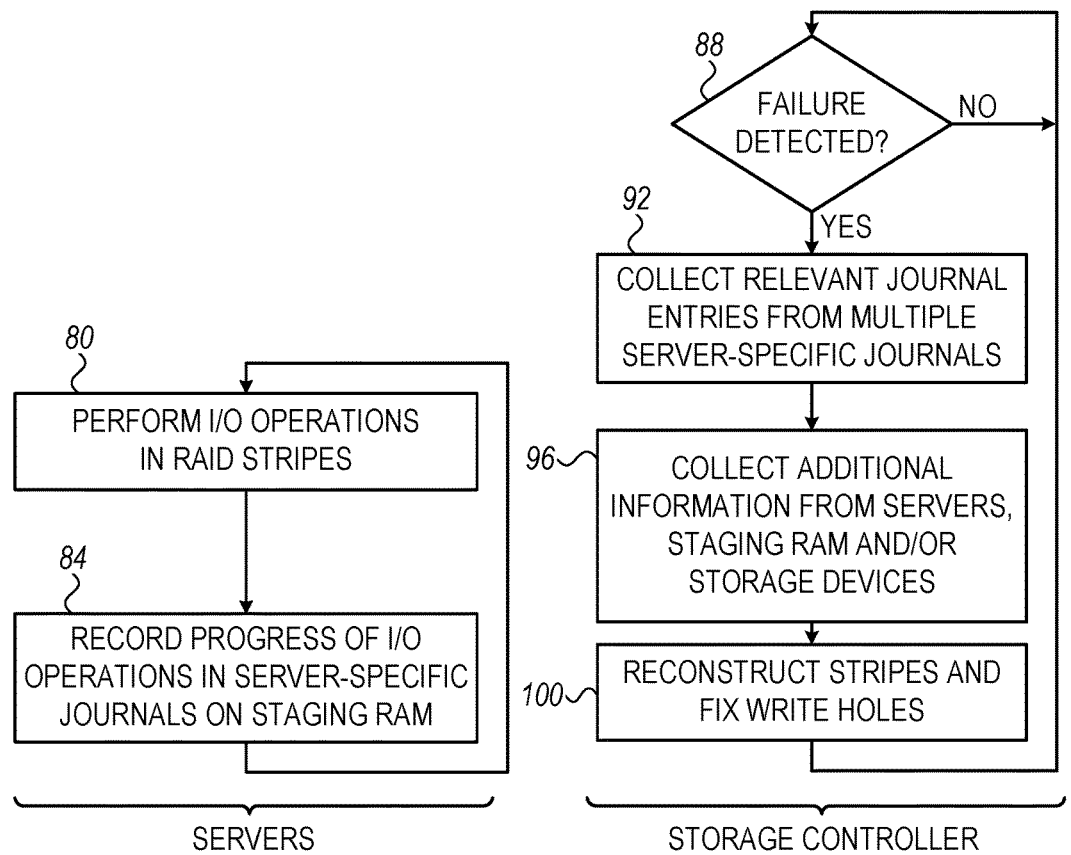
FIG. 4 is a flow chart that schematically illustrates a method for data storage, in accordance with an embodiment of the present invention.

FIG. 4 is a flow chart that schematically illustrates a method for data storage, in accordance with an embodiment of the present invention. The left-hand side of the figure shows the part of the method performed by servers 24. The right-hand side of the figure shows the part of the method performed by storage controller 36.

The server part of the method begins with storage agents 40 in servers 24 performing I/O operations in storage devices 28, at an I/O step 80. At a journaling step 80, the servers continually record the progress and state of the I/Os in journals 74. The method loops back to step 80.

The storage-controller part of the method begins with storage controller 36 detecting a failure, at a failure detection step 88. The failure may comprise, for example, any of the failure scenarios listed above. If a failure scenario is detected, storage controller 36 initiates a recovery process for recovering from the detected scenario.

The recovery process typically begins with storage controller 36 collecting relevant information for reconstructing RAID stripes that may have been corrupted by the failure and for fixing write holes. At a journal retrieval step 92, storage controller 36 retrieves relevant entries from journals 74. At an additional information retrieval, storage controller 36 retrieves additional relevant information from other sources, e.g., from staging RAM 32 and/or from servers 24. The sources of information, and the information retrieved, depend on the type of failure scenario encountered. Several examples are described in detail below. At a recovery step 100, storage controller 36 reconstructs RAID stripes and fixes write holes using the retrieved information.

Typically, the recovery process on the storage controller starts actual recovery when the server 24 in question is fully disconnected from all storage devices 28. In an embodiment, the recovery process is triggered upon receiving a disconnection notification from a storage device 28, or when a new recovery process spawns and identifies a disconnected storage device queue when receiving state from storage devices.

The recovery process starts by obtaining the current recovery ID for the disconnecting server. The recovery process then queries each storage devices 28 for the state of the queues the storage device has for the disconnected server and the server RAID ID (as defined above). Any queue with a non-matching recovery ID is regarded stale and discarded. The recovery process continues to poll storage devices 28 until all storage devices, which have any state information for the given (Server ID, Recovery ID, Server RAID ID), show these queues as disconnected. Once all known queues are disconnected, the recovery process proceeds to the actual recovery phase, following which all queues are released.

In practice, it is possible that not enough staging RAM or journals will be available after this stage. In the recovery phase, journals may be downloaded from the storage controller or storage device, as appropriate, and in case of failure, possibly from the disconnecting servers. In some embodiments, the storage controller first performs a simulated run ("dry run") of the recovery process, for assessing whether it is possible to recover all I/Os without data loss. If not, the recovery may be forced with manual intervention, in which case "magic blocks" are written in place of irrecoverable data. A human operator (e.g., administrator) is then able to identify the magic blocks and possibly fix them.

The recovery process typically handles the various disconnection notifications and state notifications from the various storage devices and staging RAM. Once recovery is warranted, the recovery process described below begins. The description below assumes that the locations of the various journals and staging RAMS (e.g., locations in the memory of storage controller 36) are known to the recovery process. The processes described below attempt to fix all possible write holes, such that all affected stripes having at least one valid WRITE_STAGE journal entry are fixed. If not enough data is available for full recovery, magic blocks are written in place of irrecoverable data.

In some embodiments, the redundancy of the RAID scheme can also be used by the recovery process for fixing write holes, even when a journal or staging RAM is not available (e.g., due to the failure). Consider, for example, an N+c RAID scheme in which each stripe comprises N data blocks and c parity blocks. The I/Os of such a scheme are therefore cached in N+c staging RAMS 43 and journaled in N+c journals 74. Upon failure, due to the redundancy, the recovery process is able to recover using fewer than all N+c staging RAMS, or using fewer than all N+c journals.

Recovery from Failure of A Recovery Process

In practice, a recovery process that recovers from some write-hole scenario may fail as well. In a High-Availability (HA) system, a passive recovery process may be running on another storage controller, and may replace the failing recovery process, e.g., if an entire controller fails. In a non-HA system, the recovery process may be re-spawned upon failure. Therefore, when a recovery process boots and after it attaches to the journals, the recovery process typically checks whether there are unhandled journal entries. If such journal entries are found, the new recovery process proceeds to commit them. It is typically assumed that journals and journal entries are handled in accordance with I/O ID, server ID and recovery ID, and are not dismissed until after the I/Os are completed.

In some cases a recovery process crash may cause a write hole, as well. For example, a recovery process may begin to destage I/Os that were acknowledged after the early-stage phase, and then crash in a later phase such that the server data is insufficient. To mitigate such scenarios, the recovery process maintains a journal of its own activities. A newly starting recovery process initially checks for the journal of a previous recovery process. If found, the new recovery process recovers the previous recovery process, and only then proceeds to server recovery.

In some embodiments, recovery of recovery-process journals differs from recovery of server journals. The write-hole recovery process assumes that stripes targeted for recovery are untouched since the server disconnected. Writes performed by a recovery process to a recovered stripe invalidate this process, and therefore performing recovery again afterwards is impossible. Thus, I/Os that have already been recovered should not be recovered again by a newly spawned recovery process. For this purpose, the recovery process typically sorts all I/Os according to their io_request_id. When performing recovery writes through its own RAID layer, the recovery process states the io_request_id of the recovered I/O along with the I/Os RAID ID, such that a newly spawned recovery process will be able to infer which I/Os to skip (io_request_id below or equal to last_recovered_id) and which I/Os to recover.

In some cases, one or more storage devices 28 may fail while the recovery process is in the process of handling journals. If the number of failing storage devices exceeds the provisioned level of redundancy (e.g., 2 in RAID-6, and 1 in RAID-5), the recovery process cannot proceed and the data is lost. In such a case the recovery process will typically stop recovering and wait for the state to change back (e.g., manually). If the number of failing storage devices is within the redundancy capabilities of the applicable RAID scheme, the recovery process may proceed normally, except for performing degraded reads and writes that exclude the failed storage devices.

Example Recovery-Process Pseudo-Code

The pseudo-code below begins with the top level process. The process begins with waiting for the server to be completely disconnected from all storage devices. The process then proceeds to retrieve all the journals and staging RAMS associated with the affected server. Then, the revive_host process revives each RAID layer instance (for each datapath thread running on the server). The revival is first executed as a simulated recovery ("dry run"). Only if the simulated recovery is found successful, the actual recovery is performed.

```
revive host(disconnected host id)

1.   wait_for_host_to_be_disconnected_from_all_storage_
devices(disconnected_host_id)
2.   retriever <- JournalRetriever(disconnected_host_id)
3.   revived_raid_ids <- { }
4.   retriever.retrieve ( )
5.   all_revived <- true
6.   for each raid_layer in retriever such that
raid_layer.id not in revived_raid_ids:
        a.   if       force_revive       or
revive_raid_dry_run_successful(raid_layer, retriever):
// force_revive may be set manually to allow finishing
the recovery manually even if corruption results.
             i.    revive_raid(raid_layer, retriever)
             ii.   revived_raid_ids.add(raid_layer.id)
        b.   else:
             i.    all_revived <- false
7.   if all_revived:
        a.   return
8.   configurable: If app state received (disconnected or
N/A) from all storage devices the server was connected to
(storage device list is part of the journal header), mark
force_revive.
9.   wait a while to let storage devices/host to
reconnect with available journals
10.  goto 4 revive raid dry run successful (raid layer, retriever):

1.   recoverer      <-      Recoverer(raid_layer,
retriever.info_for_recoverer( ), dry_run=true)
2.   try:
        a.   recoverer.recover_raid( )
3.   except:
        a.   return false;
4.   return true
revive raid(raid layer, retriever):
1.   recoverer      <-      Recoverer(raid_layer,
retriever.info_for_recoverer( ))
2.   recoverer.recover_raid( )
```

The following process retrieves journals and staging RAM data. In this example embodiment, the assumption is that the staging RAM and journals reside on the storage devices themselves. The process can be modified in a straightforward manner to retrieve the journals and staging RAM data from the storage controllers or from any other location, such that the staging RAM and journals are saved on the controllers, per storage device, or sharded between the servers.

The process starts by traversing all storage devices that are connected to the currently executing recovery process, and obtaining all available journals and staging RAM buffers from the storage devices. In a second phase, the process attempts to obtain journals or staging RAM data that is still missing, from the disconnected server itself, if available, through one or more control channel connections.

```
object JournalRetriever:
    members:
        disconnected_host_id // This is the host_id that
        triggered the recovery process
        journals <- { } // map from storage device id to a
```

```
        container of journal per raid/dp.
        staging_ram <- { } // map from storage device id to a
        container of staging_ram per raid/dp.
        pending_storage_devices <- {all storage devices
        connected to the reviver process}
retrieve( )

1.  for each storage_device in pending_storage_devices:
        a.  if journals.contains(storage_device.id)
            i.  continue
        b.  journals[storage_device.id]<-read_journals
(storage_device, host_id)
        c.  staging_ram[storage_device.id]<-
read_staging_rams(storage_device, host_id)
        d.  remove storage_device from pending
    2.  for each storage_device_id:
        a.  if journals contains storage_device_id:
            i.  continue
        // Try to obtain journals/staging RAM data from the
host through the control connection
        b.  journals [storage_device_id]<-
read_journals(disconnected_host_id, storage_device_id)
        c.  staging_ram[storage_device_id]<-
read_staging_rams(disconnected_host_id,storage_device_id)
    3.  return true
```

The "Recoverer" below implements the heart of the recovery process. This process assumes an N+c RAID or erasure coding scheme, where c is the redundancy. Recovery begins by parsing all available journals into an intermediate container that maps from I/O ID, which is unique per RAID layer instance, to maps from storage device ID to containers of journal entries. Writes are then recovered one by one, depending on whether they are full-stripe writes or partial-stripe writes

```
class Recoverer:
    members:
        journals <- {Available journals} // map from storage
        device id to journal
        staging_ram <- { Full staging RAM per journal }
        unrecoverable_journals <- {Max c journals out of
        N+c}
        io_journal_map <- { } // map from I/O id to a
        container of journal entries, per storage device
        host_id
        raid_id
        dry_run // If dry run, do not write anything. Issue
        an exception if there is an I/O that cannot be
        recovered.
recover raid( )

1.  parse_journals( )
    2.  recover_ios( )
    3.  mark datapath as recovered
parse journals( )

1.  for each journal in journals:
        a.  for each journal_entry in journal:
            i.  if  journal_entry.io_id  not  in
            recovered_io_ids:
                1.
                    io_journal_map[journal_entry.io_
                id].add(journal.storage_device_id, journal_entry)
recover ios( )

1.  for each io in io_journal_map, sorted by io id:
        a.  sanity check that all raid parameters match
        b.  recover_io(io)
recover io(io)

1.  recovery_io <- new fsw io that will be filled with
data
    2.  for each stripe in io:
        a.  if full stripe write:
            i.  recover_fsw(stripe, io, recovery_io)
        b.  else
            i.  recover_psw(stripe, io, recovery_io)
    3.  if not dry_run:
        a.  Write recovery_io through the local RAID layer
// The recovery_io is guaranteed to consist of full
stripes only
recover fsw(stripe, io, recovery io)

1.  stg_count <- number of stage entries in available
journal entries
    2.  if stg_count < N: // (in N + C RAID)
// Cannot or no need to recover the write, just make sure
the parities are correct
        a.  if dry_run and (number of available journals <
N)
            i.  throw "Cannot recover io"
        b.  recovery_io.append(read full stripe through
raid layer)
        c.  return
    3.  stripe ws <- Recover data blocks from parities if
needed
    4.  recovery_io.append(ws)
recover psw(stripe, io, recovery io)

1.  missing_stg_journals <- {storage_device_ids that
should have a stage journal entry for this stripe in this
io, including parities, but do not; with all storage
devices phased-in (ignoring degraded state)}
    2.  not_written_to_storage_devices <- (there exists a
journal with a stage entry but without a read complete
entry for this stripe)
    3.  if (count (missing_stg_journals)  >  C)  and
not_written_to_storage_devices:
// It is impossible that we have written to storage
devices in this io, and there is not enough info to
recover the write. Either the host did not send enough
stage entries and the write was not acknowledged, or the
host sent enough stage entries and we are missing their
journals (the host may have returned an ack, and we leave
the old data.)
        a.  if dry_run and (number of available journals <
N)
            i.  throw "Cannot recover io"
        b.  recovery_io.append(read full stripe through
raid layer)
        c.  return
    4.  stripe ps <- best_effort_recover_previous_stripe
(stripe, io, missing_stg_journals)
// Irrecoverable blocks may still be missing from ps at
this stage
    5.  if count(missing_stg_journals) > C:
// May have written to storage devices (because of 3
above) Write previous, potentially with magic blocks if
we have failed to recover ps
        a.  if dry_run:
            i.  throw "Cannot recover io"
        b.  Replace still missing data blocks in ps with
magic block
        c.  recovery_io.append(ps.data)
        d.  return
    6.  ws <- copy(ps) // Just for naming clarity, not
needed
    7.  overwrite blocks in ws with existing staged data
(including parities)
    8.  Remove blocks of missing_stg_journals from ws
    9.  if ws recoverable:
        a.  recover blocks in ws for data storage devices
in missing_stg_journals
    10. Else
        a.  if dry_run:
            i.  throw "Cannot recover io"
        b.  Replace still missing data blocks in ws with
magic block
    11. recovery_io.append(ws.data)
best effort recover previous stripe(stripe,         io, missing stg journals)
```

-continued

```
1. recovery_degraded_storage_devices <- degraded_state
// current, not I/O time
2. ps <- empty stripe in memory
3. add all read_complete blocks to ps // Some may have
been overwritten on storage devices, some may be
unavailable as the storage devices failed in the
meanwhile.
4. if not_written_to_storage_devices:
     a.   storage_devices_not_to_read_from        <-
recovery_degraded_storage_devices
5. Else:
// Do not read from storage devices we are missing
journals for, as they may have been written to.
     a.   storage_devices_not_to_read_from        <-
recovery_degraded_storage_devices U missing_stg_journals
6. for each missing block in ps that is not in
storage_devices_not_to_read_from:
     a.   read block from storage device, if failed - add
storage device to recovery_degraded_storage_devices (fail
storage_device)
7. if ps is recoverable:
     a.   recover missing data blocks in ps // ps is now
a full stripe before the write
```

ADDITIONAL EMBODIMENTS AND VARIATIONS

Multiple Data-Path Instances Per Server

As noted above, a given server 24 may run multiple instances of the storage data path. Each data-path instance (referred to as "thread") accesses storage devices 28 independently of the other instances. This sort of configuration is useful, for example, for increasing the rate of I/O operations and throughput in general.

Since sharing of resources among threads on a multi-core computer typically involves contention that degrades performance, each data-path instance typically runs a separate instance of RAID layer 44. A given thread is typically pinned to a specific processing core of the server.

In some embodiments, inter-thread locking may be used to locally coordinate access to individual stripes or groups of stripes, since accessing the same stripe by two threads, if one or more of the access operations is a write, may lead to data corruption. In other embodiments, sharding may be used such that I/Os of two different threads will not overlap the same stripes. The sharding distribution may comprise a modulo distribution, a random or pseudo-random distribution, or any other suitable distribution that reduces the risk of overloading a specific thread due to locality of reference.

Typically, a global distributed lock may be used if the same stripes are shared between different servers. Local (per-thread) locking or a local write-combining cache may be used to preserve stripe consistency between I/Os targeting the same stripe running in parallel from the same thread (same queue, with queue depth higher than one).

For the sake of clarity, the embodiments described herein assume that, in response to a disconnection of one or more of the RAID layers, all other RAID layers 44 in all threads on the same server should be drained from I/Os and disconnected, as well. It is also assumed that a RAID layer should completely disconnect if even one of the connections to its storage devices is lost. This choice, however, is made purely for the sake of clarity. In alternative embodiments, the disclosed techniques can be implemented without these constraints.

Typically, a server generates a Universally Unique ID (UUID) referred to as "recovery ID" on every connection of all RAID layers from a given server. The pair {Server ID, Recovery ID} uniquely identifies all connected data paths of that server. The recovery ID is generated and sent through the control channel to storage controllers 36, where it should be replicated and persisted. Only then, the RAID layers are allowed to actually connect. The recovery ID is typically stored as one of the parameters of the relevant journal entries, as described above.

Staging RAM Considerations

As noted above, staging RAM unit 42 comprises a respective memory area (e.g., RAM, Non-Volatile RAM (NVRAM) or other type of shared storage media) allocated for each {server 24, storage device 28} pair. This area serves as a staging area for write I/Os, written from the server to the storage device. In some embodiments, the staging RAM is also used for temporary storage of read I/Os, en-route from the storage device to the server. Typically, the staging RAM is accessible to both the server and the storage device, e.g., using RDMA or some local access.

The staging RAM size is typically sufficiently large for holding the per-storage-device maximum I/O size times the queue depth (the number of on-the-fly I/Os from a server to a storage device). The staging RAM may be allocated, for example, on a storage device 28, on a storage controller 36 or even on a server 24. In an embodiment, the staging RAM is segmented into slots of maximum per-storage-device I/O size, such that each I/O is provided with a single contiguous slot. In other embodiments, a finer granularity allocation (e.g., block size allocation) may be used.

The staging RAM may be used as a write cache, such that writes are acknowledged once the data is successfully stored in the staging RAM, long before it is destaged to the underlying storage device. This technique significantly reduces write latency, but may require a redundancy scheme for the staging RAM itself.

Furthermore, acknowledging writes placed in the staging RAM enables supporting a larger write I/O population than the underlying queue depth. In a typical system, a user application will rarely require more than a certain number of parallel writes, e.g., 128 parallel writes. Nevertheless, a larger write cache allows sustaining larger write bursts from the application at very low latency, regardless of the degree of parallelization at the application level. Such a large write cache can be viewed as converting a small queue-depth (e.g., qd=1) write workload into a large queue depth workload, significantly improving the average write latency, throughput and IOPS of such workloads.

In some embodiments, the content of each staging RAM is replicated on two or more storage controllers 36. Such replication, if performed by the servers, would double the throughput per I/O. In some embodiments, one copy of each staging RAM is kept on the server itself, and at least one other copy is kept either on one of the controllers or on its respective storage device, achieving similar dual redundancy.

Implementation Using Staging Disk Instead of Staging RAM

In some embodiments, the functionality of staging RAM unit 42 can be implemented using a disk (referred to as "staging disk") instead of RAM. This sort of implementation is useful, for example, for implementing the disclosed techniques on a Just a Bunch Of Disks (JBOD) enclosure. Consider, for example, an NVMe-over-Fabrics JBOD enclosure that comprises storage devices 28. Such an enclosure typically does not have a built-in RAM that could be used as staging RAM unit 42. Adding an external RAM unit, on the other hand, would increase communication overhead considerably. When using disk space internal to the JBOD enclosure to replace the staging RAM, this overhead is eliminated.

In these embodiments, the system allocates, either statically or dynamically as appropriate, an area on each storage device 28 for temporary placement of write data. This area thus serves as a staging disk. For each write I/O, a server 24 writes the data directly to the staging disk (or disks), similarly to writing to staging RAM in the methods above, acknowledging the write once the data is successfully stored on the staging disk (or disks). Similarly to the functionality of staging RAM unit 42, for the duration of the write, one copy of the data is placed on the server itself, and at least one other copy is placed on the staging disk, depending on the redundancy requirements of the system.

When destaging data to persistent storage, the data is moved from the temporary (staging) locations to the final locations on the storage devices. Such movement can be performed efficiently by implementing a move command in the storage device. A move command may be implemented efficiently on virtualized devices such as SSDs, where a Flash Translation Layer (FTL) can be manipulated by simply pointing to the data instead of physically moving it. Otherwise, the data may be copied internally by the storage device. Standard SCSI commands or their parallels in other storage device protocols, such as Extended Copy (XCOPY) or Offloaded Data Transfer (ODX), may be used for this purpose, without transferring the data over the network in the destaging phase. Thus, in the destaging phase the data is moved at most once.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for data storage, comprising:
in a system that comprises multiple servers, multiple multi-queue storage devices and at least one storage controller that communicate over a network, wherein each of the multi-queue storage devices provides multiple server-specific queues for storage commands, queues the storage commands received from each server in a separate respective server-specific queue, and has the freedom to schedule and reorder execution of the storage commands, storing data by the servers in a storage process that (i) caches the data in a cache memory that is accessible to the servers and to the storage devices and (ii) de-stages the cached data from the cache memory to the storage devices;
continually journaling a progress of the storage process, by the servers, in a plurality of server-specific journals residing in the cache memory; and
in response to a failure occurring during the storage process, recovering the data by the storage controller based on the server-specific journals.

2. The method according to claim 1, wherein storing the data and journaling the progress are performed by remote direct memory access, without triggering or running code on any CPU of the storage controller.

3. The method according to claim 1, wherein storing the data comprises distributing across the storage devices stripes that comprise the data and redundancy associated with the data, and wherein recovering the data comprises reconstructing the stripes based on the server-specific journals and the redundancy.

4. The method according to claim 3, wherein recovering the data comprises, in response to a failure associated with a given server, collecting from the server-specific journals entries relating to one or more stripes accessed by the given server, and reconstructing the stripes based on the entries.

5. The method according to claim 3, wherein recovering the data comprises obtaining at least some of the data or the redundancy from one or more of the servers, and reconstructing the stripes using the data or the redundancy obtained from the one or more of the servers.

6. The method according to claim 1, wherein the failure occurs in a recovery process that runs in the storage controller.

7. The method according to claim 1, wherein recovering the data comprises performing a simulated run of a recovery process that recovers the data, and, only upon success of the simulated run, performing an actual run of the recovery process.

8. The method according to claim 1, wherein storing the data comprises storing a first copy of the cache memory on one or more of the servers, and storing a second copy of the cache memory on the storage controller or on one or more of the storage devices.

9. The method according to claim 1, wherein caching of the data in the cache memory and subsequent de-staging of the data to the storage devices comprises increasing an effective queue depth of a workload that generates the data.

10. The method according to claim 1, wherein the cache memory resides on the storage devices, such that storing the data comprises transferring the data over the network only once.

11. A system for data storage, comprising:
multiple servers, which are configured to store data over a network on multiple multi-queue storage devices, wherein each of the multi-queue storage devices provides multiple server-specific queues for storage commands, queues the storage commands received from each server in a separate respective server-specific queue, and has the freedom to schedule and reorder execution of the storage commands, in a storage process that (i) caches the data in a cache memory that is accessible to the servers and to the storage devices and (ii) de-stages the cached data from the cache memory to the storage devices, and to continually journal a progress of the storage process in a plurality of server-specific journals residing in the cache memory; and
at least one storage controller, which is configured, in response to a failure occurring during the storage process, to recover the data based on the server-specific journals.

12. The system according to claim 11, wherein the servers are configured to store the data and to journal the progress by remote direct memory access, without triggering or running code on any CPU of the storage controller.

13. The system according to claim 11, wherein the servers are configured to store the data by distributing across the storage devices stripes that comprise the data and redundancy associated with the data, and wherein the storage controller is configured to reconstruct the one or more stripes based on the server-specific journals and the redundancy.

14. The system according to claim 13, wherein, in response to a failure associated with a given server, the storage controller is configured to collect from the server-specific journals entries relating to one or more stripes accessed by the given server, and to reconstruct the stripes based on the entries.

15. The system according to claim 13, wherein the storage controller is configured to obtain at least some of the data or the redundancy from one or more of the servers, and to reconstruct the stripes using the data or the redundancy obtained from the one or more of the servers.

16. The system according to claim 11, wherein the failure occurs in a recovery process that runs in the storage controller.

17. The system according to claim 11, wherein the storage controller is configured to perform a simulated run of a recovery process that recovers the data, and, only upon success of the simulated run, to perform an actual run of the recovery process.

18. The system according to claim 11, wherein the servers are configured to store a first copy of the cache memory on one or more of the servers, and to store a second copy of the cache memory on the storage controller or on one or more of the storage devices.

19. The system according to claim 11, wherein, by caching the data in the cache memory and subsequent de-staging the data to the storage devices, the servers are configured to increase an effective queue depth of a workload that generates the data.

20. The system according to claim 11, wherein the cache memory resides on the storage devices, such that the servers are configured to store the data by transferring the data over the network only once.

* * * * *